United States Patent Office 3,278,310
Patented Oct. 11, 1966

3,278,310
PROCESS OF MAKING POWDERED MILK
CONTAINING LECITHIN
Alexander W. Williams, Syracuse, and Albert A. Busch, North Syracuse, N.Y., assignors to The Borden Company, New York, N.Y., a corporation of New Jersey
No Drawing. Filed Aug. 5, 1963, Ser. No. 300,104
2 Claims. (Cl. 99—56)

This invention relates to recombined fat-containing powdered dairy products having improved flowability and dispersibility by the incorporation therein of lecithin.

According to methods previously proposed in the prior art, the product is coated with lecithin. While generally successful these methods do not improve the flowability of the product and moreover, result in the formation of an undesirable fatty-like film on the surface of the reconstituted liquid. Further, the presence of lecithin on the outside of the powder makes the lecithin more exposed to oxygen with resultant development of off-flavors and other undesirable characteristics.

It is the object of the present invention to prepare a recombined powdered milk product containing lecithin and at least 6% milk-derived fat whereby there is achieved excellent dispersibility, flowability, wettability, flavor and stability with minimal tendency to foam upon mixing with water, while at the same time avoiding greasiness and off-flavors in the powdered product.

According to the present invention, a recombined fat-containing powdered milk product is prepared by mixing lecithin with a milk-derived fat at a temperature sufficient to maintain the fat in a liquid state, thereafter dispersing the lecithin-containing heated fat, preferably by homogenization, into a concentrated skim milk in a quantity sufficient to give a final fat content of at least 6%, preferably 6–48%, while maintaining the temperature of the concentrated skim milk at a minimum of 110° F. and thereafter drying the so combined fluid. For best results the bulk density of the product is increased.

Lecithin, the commercial name for a mixture of phospholipids, is commercially available as derived from various vegetable oils such as cotton seed oil, corn oil or soybean oil. Commercially available lecithin products suitable for use in the present invention generally comprise lecithin dispersed in an oil carrier wherein the lecithin comprises at least 60% of the commercial product. Lecithin dispersed in a soybean oil carrier is particularly suitable for practice in this invention. The portion of commercial lecithin preparation comprising acetone-insolubles is generally termed "active lecithin," and in the process of this invention active lecithin must be present in the final powder in amount from about 0.05% to 4.0% by weight. It has been found that by employing this level of lecithin, the above enumerated desirable results are obtained without imparting an off-flavor to the product which might result from utilizing larger quantities of lecithin.

Though the lecithin is preferably incorporated into anhydrous milk fat before addition of the fat to the concentrated skim milk, it has been found that this is not essential in the process of the invention and that the lecithin may be added to a lacteal dispersion containing at least 40% milk fat. This lacteal dispersion containing at least 40% milk fat is, of course, produced by separation of whole milk. The quantity of active lecithin added to the lacteal dispersion containing at least 40% milk fat is such as to constitute approximately 0.004–0.70 pound per pound of milk fat, and preferably 0.005–0.02 pound per active lecithin per pound of milk fat.

As indicated previously, the lecithin is added and mixed with the lacteal dispersion containing at least 40% milk fat at a temperature generally of at least 110° F. and preferably within a range of 110–120° F. The level of added lecithin in the final powdered product is governed by the fat content thereof when the lecithin is added to the butter fat in the quantity described, this is illustrated in the following table:

| Percent Fat in Powder | 6 | 12½ | 18 | 26 | 48 |
|---|---|---|---|---|---|
| | Pounds Lecithin Per Pound Fat | | | | |
| Percent lecithin in powder :[1] | | | | | |
| 4 | 0.66 | 0.33 | 0.22 | 0.15 | 0.083 |
| 2 | 0.33 | 0.166 | 0.11 | 0.075 | 0.041 |
| 1 | 0.166 | 0.083 | 0.055 | 0.033 | 0.021 |
| 0.5 | 0.083 | 0.041 | 0.027 | 0.019 | 0.010 |
| 0.05 | 0.008 | 0.004 | 0.003 | 0.002 | 0.001 |

[1] Lecithin expressed as active lecithin.

The lecithin-containing milk fat is then homogenized into concentrated skim milk having a maximum water content of approximately 65% which concentrate must be maintained at a temperature sufficient to maintain the fat in a liquid state, preferably 110° F. or higher for normal butter fat, and this concentrate is thereafter dried to powder form by any suitable means, e.g. by spray drying.

Preferably, the bulk density of the product is increased in order to obtain the best dispersibility, flowability, and wettability. This is accomplished by drying to a larger particle size in a tower drier. Increased bulk density can also be obtained by the known procedures of agglomerating or aggregating the dried powder.

By virtue of the above process, there is preferably produced a powdered milk product having a fat content ranging from 6–48% and containing 0.05% to 4.0% of active lecithin by weight.

Without being bound by any theory, it is believed that the excellent properties of the product produced by this invention are realized because the lecithin dissolved in the butter fat remains with the fat throughout the homogenization process when incorporated into the concentrated skim milk. It appears that some of the lecithin may be inside the fat globules formed, though the major portion likely becomes part of the fat globule membrane, to result in the increased wettability of the powder by overcoming the hydrophobic properties of the fat. The resultant powder is more easily dispersed because of the increased attraction between the fat and water, the foam problem during reconstitution in water is minimized because of surface active properties of the lecithin on and in the fat globules, and the powder is loose and without greasiness because of the increased fat globule membrane material and decreased size of fat globules due to homogenization, both of which retard fat leakage into the powder.

In order to further illustrate the practice of the present invention, the following specific examples are presented wherein all parts, unless otherwise indicated, are by weight.

EXAMPLE 1

*12.5% powder*

1.15 parts of a commercial lecithin preparation (66% active lecithin) was dispersed, by stirring, into 100 parts of milk fat at a temperature of 120° F. The milk fat-lecithin mixture was then blended with 1528 parts of condensed skim milk (0.24% fat and 45.93% solids-not-fat) at a temperature of 120° F., and 153 parts of water, by double stage homogenization using 500 lbs. second stage and 2500 lbs. total pressure, to produce a concentrate having a fat to solids-not-fat ratio of 1 to 6.75. This concentrate was then dried in a conventional tower drier to produce a 12.5% fat powder containing added lecithin at the level of 0.09%. The powder was placed in drums and cooled by placing the drums in a cold storage room at 40° F. overnight, after which it was held at room temperature storage and gas-packed in cans.

The powder dispersed easily in water at 40° F. with simple stirring, using 25 grams of powder and 200 ml. of water, and retained this character after prolonged storage. The powder had an open body, was free flowing, and free from greasiness.

EXAMPLE 2

*26% powder*

1.12 parts of a commercial lecithin preparation (66% active) was dispersed, by stirring, into 100 parts of milk fat at a temperature of 120° F. The milk fat-lecithin mixture was then blended by homogenization with 644 parts of condensed skim milk at 120° F. and 83.4 parts water to form a milk concentrate at 44% total solids having a fat to solids-not-fat ratio of 1 to 2.65. The concentrate was dried in a conventional horizontal spray drier to produce a 26% fat powder containing added lecithin at the level of 0.18%. The powder was collected in drums and placed in a 40° F. cold storage room overnight, instantized the following day using a Blaw-Knox instantizer and filled into cans and gas-packed. The powder dispersed easily in water at 40° F. with simple stirring, using 27 grams of powder and 200 ml. of water, and has retained this character for 10 months. The powder had an open, granular body and was free from greasiness. Flowability here was not as good as in lower fat powders since the size of the aggregates was limited because of the high fat content.

It will be understood that it is intended to cover all changes and modifications of the examples of the invention herein chosen for the purpose of illustration which do not constitute departures from the spirit and scope of the invention.

What is claimed is:

1. A process for preparing a recombined powdered milk product comprising dissolving lecithin in milk-derived fat at a temperature sufficient to maintain the fat in a liquid state, homogenizing said lecithin-containing fat in concentrated skim milk containing at most 65% water and having a minimum temperature of 110° F. and thereafter drying and increasing the bulk density of said milk, the quantity of added fat being sufficient to result in a final fat content of 6–48% in the powder and an active lecithin content of 0.05–4.0% in the powder.

2. The process of claim 1 wherein 0.005–0.02 part of lecithin is dissolved in each part of fat by weight.

References Cited by the Examiner
UNITED STATES PATENTS

| | | | |
|---|---|---|---|
| 2,399,565 | 4/1946 | North et al. | 99—56 |
| 2,953,458 | 9/1960 | Sjollema | 99—56 |
| 3,042,526 | 7/1962 | Spiess et al. | 99—56 |
| 3,120,438 | 2/1964 | McIntire et al. | 99—56 |
| 3,126,283 | 3/1964 | Noznick et al. | 99—55 |
| 3,126,289 | 3/1964 | Spilman et al. | 99—203 |

FOREIGN PATENTS 226,996   2/1960   Australia.

A. LOUIS MONACELL, *Primary Examiner.*

L. M. SHAPIRO, *Examiner.*